(No Model.)
J. BLATTNER.
FEED TROUGH.
No. 310,554. Patented Jan. 13, 1885.
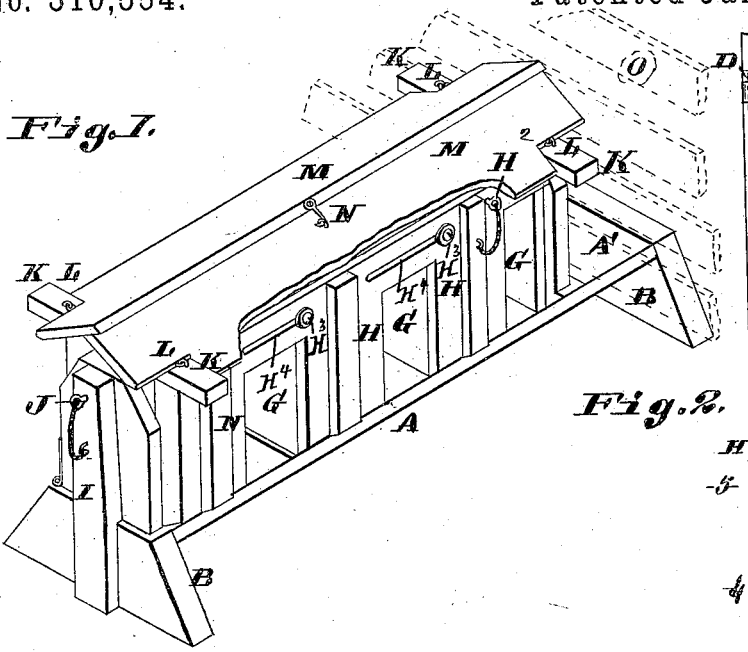
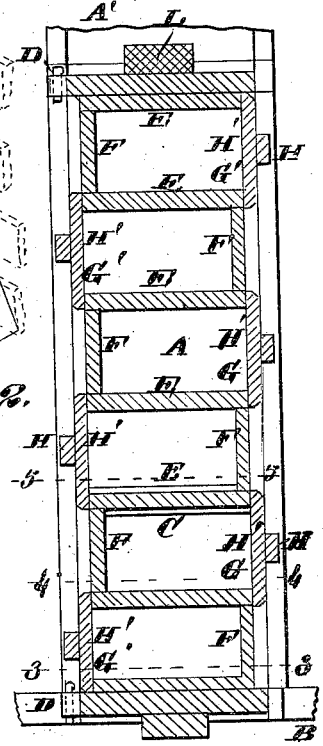
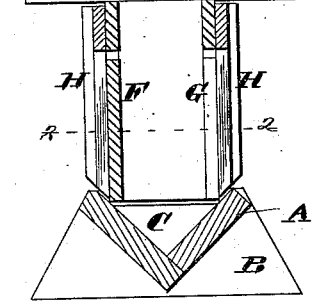
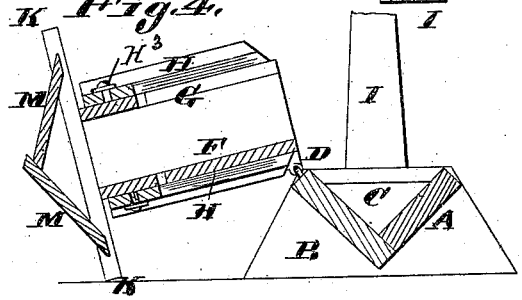
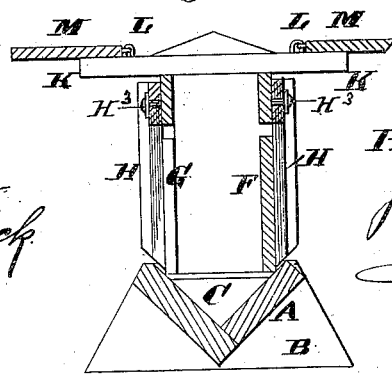
Attest:
Edward Stev
Geo. L. Wheelock
Inventor:
Joseph Blattner
By Knight Bros
Attys

UNITED STATES PATENT OFFICE.

JOSEPH BLATTNER, OF HIGHLAND, ILLINOIS.

FEED-TROUGH.

SPECIFICATION forming part of Letters Patent No. 310,554, dated January 13, 1885.

Application filed March 14, 1884. (No model.)

*To all whom it may concern:*

Be it known that I, JOSEPH BLATTNER, of Highland, in the county of Madison and State of Illinois, have invented a certain new and useful Improvement in Troughs for Watering and Feeding Hogs and other Stock, of which the following is a full, clear, and exact description, reference being had to the accompanying drawings, forming part of this specification.

Figure 1 is a perspective view with the situation of a fence indicated in dotted lines. Fig. 2 is a horizontal section at 2 2, Fig. 3, except that the head-openings are closed. Fig. 3 is a transverse vertical section at 3 3, Fig. 2. Fig. 4 is a transverse section at 4 4, Fig. 2, the covering-frame being turned down, (uncovering the trough.) Fig. 5 is a transverse section at 5 5, Fig. 2, the roof being thrown open.

I shall describe the improvement as applied to a hog-trough. The trough A may have the ordinary angular form, as shown. B are the feet upon which it is supported. C is a block placed transversely in the trough and nailed fast, so as to confine the feed to one part when the number of hogs is not great enough to require the whole of the trough. To one side of the trough is secured, by hinges D, what I shall call the "guard-frame." This is made with a number of transverse upright board partitions, E, connected at alternate sides by upright boards F, thus leaving openings G alternately at either side, through which the heads of the hogs may be thrust to gain access to the contents of the trough.

H are sliding boards having apertures that may be brought in line with the apertures or openings G, and between the openings having parts H', that serve to close the openings G when the boards H are in the position shown in Fig. 2.

H² are holding-pins.

H³ are bolts by which the shutters or boards are secured to the guard-frame, and H⁴ slots through which the bolts are inserted.

I are standards fixed to the trough A at the ends of the guard-frame E F, and serving to support the guard-frame in an erect position by means of pins J, which are inserted in holes of the standards and frame.

K are transverse brackets secured horizontally upon the top of the guard-frame at the ends thereof, (and where the trough is long there may be one or more intermediate brackets.)

To the brackets K are hinged at L the two inclined boards, M, forming the roof. The brackets are made sufficiently long to form supports for the hinged roof-boards when they are opened out, as shown in Fig. 5. When the boards M are folded together to form a roof, they may be secured by a hook, N. (See Fig. 1.) The trough A is preferably extended farther than the frame E F at one end, and such extension A' may be outside the fence O of the hog-lot, so that the trough may be charged with water or swill from such position.

In feeding solid or half-solid food when the hogs are present the shutter-boards H may be in the position shown in Fig. 2, so that the animals cannot gain access to the apertures G, and the roof-boards M being placed in the position shown in Fig. 5, the corn or other material may be thrown into the trough from above. The roof may be then closed and the shutter-boards slid so as to open the apertures G.

It will be seen that the hogs cannot easily interfere with each other when feeding, nor waste the feed, and that chickens cannot enter the trough. The hinges L are preferably of the gate-hinge pattern, so that the guard-frame and roof may be disconnected from the trough by an end movement when it is let down, as in Fig. 4.

I am aware that the bodies of troughs have been hinged to their bases; that hinged covers to open outward have been employed; that feed-openings on one side have been alternated with feed-openings on the other side, and that sliding shutters for closing the openings are old. Such features, therefore, I do not claim, broadly.

I claim as my invention—

In combination with the trough A, the standards I, the guard-frame consisting of transverse boards E, longitudinal boards F, connecting the transverse boards, leaving openings G, sliding boards H, having suitable apertures and secured to the longitudinal boards, transverse brackets K, secured horizontally on the top, and inclined boards M, hinged to the brackets to close inwardly and open outwardly, as set forth.

JOSEPH BLATTNER.

Witnesses:
ROBT. HAGNAUES,
GEORGE ROTH.